Sept. 8, 1931.          J. TAYLOR          1,822,680
MILKING MACHINE
Filed Nov. 13, 1929

Inventor:
Joseph Taylor
By Carpenter
att'y

Patented Sept. 8, 1931

1,822,680

UNITED STATES PATENT OFFICE

JOSEPH TAYLOR, OF ELTHAM, NEW ZEALAND

MILKING MACHINE

Application filed November 13, 1929, Serial No. 406,788, and in New Zealand August 10, 1929.

This invention relates to vacuum milking machines of the kind in which pulsations are caused by alternate air and vacuum obtaining between the outer surface of the teat cup inflation element and the inner surface of the teat cup body.

In the past there has been no satisfactory method provided for scouring and cleaning that part of the teat cups between the outside surface of the inflation element and the inside surface of the cup body without taking the portions of the cup apart, and it is the object of the present invention to provide a satisfactory method of cleaning this part while the cups are in position on the claw by connecting the pulsation nipple with continuous vacuum.

According to the present invention, an opening or openings is or are provided at or near the top of the cup casing, and means is provided to normally close said opening or openings to prevent air entering the space between the cup casing and the inflation element, such means being adapted for manipulation to uncover the opening or openings to permit water or other cleansing fluid to be drawn therethrough into the space between the casing and the inflation element by exhausting air from said space.

A form of the invention will be described with the aid of the accompanying drawings, wherein:—

Figure 1:
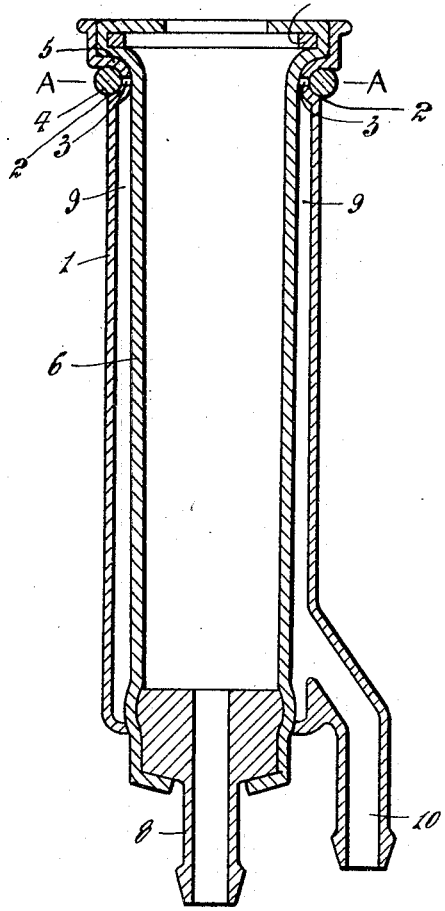
Figure 4:
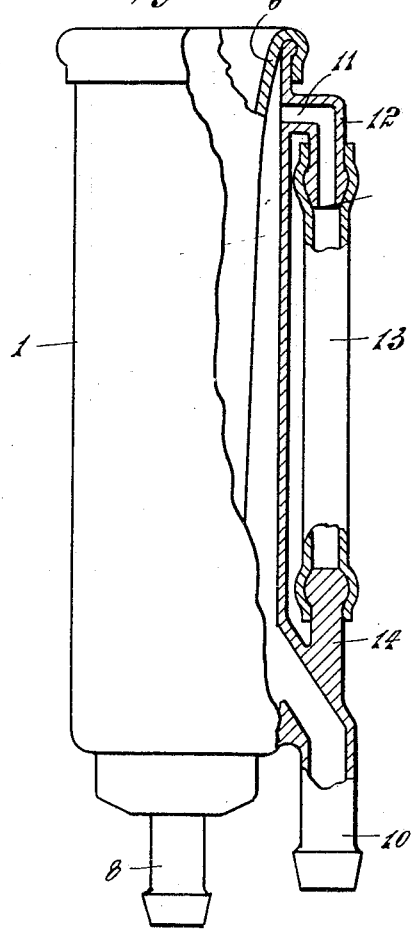
Figure 2:
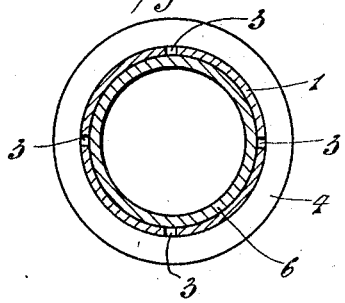
Figure 3:
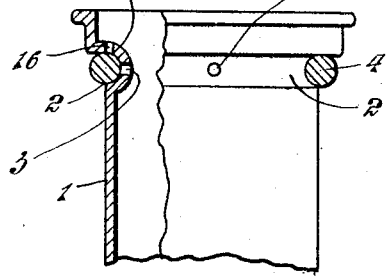

Figure 1 is a cross section through a cup.
Figure 2 is a sectional plan on line A—A Figure 1.
Figure 3 is an elevation of the upper end of the cup partly in section.
Figure 4 is a view of a cup partly in section showing an alternative form of carrying out the invention.

Referring to the drawings, and first to Figures 1 to 3, the cup casing 1 has formed on its upper end a circumferential groove 2 on the exterior of the cup. This groove contains a number of holes 3 communicating with the inside of the cup casing. A rubber ring 4 is carried by the groove 2 to prevent air from entering the cup during the milking period. The forming of the groove 2 in the cup illustrated provides a circumferential ridge 5 projecting into the cup over which the inflation element 6 passes, while a metal ring 7 placed above this rim retains the inflation element in position at the top of the cup. The lower part of the inflation element may be secured in position by a milk nipple 8, such as shown or by any other suitable form of nipple. It will be seen, therefore, that the holes 3 communicate with the space 9 between the inside surface of the cup casing 1, and the outer surface of the inflation element. When it is desired to clean between these two surfaces and the spaces between them the rubber ring 4 is simply removed from the groove 2 and upon the teat cup being placed into water and the space 9 exhausted of air by means of the pulsation nipple 10, water or other washing fluid is drawn through the holes 3 at different points around the circumference of the cup, along the space 9 between the outer surface of the inflation element and the inner surface of the cup casing, thus thoroughly cleansing these portions of the cup.

In Figure 3 additional holes 16 are shown in the portion of the cup casing on which the inflation element is held seated by the ring 7. These holes enable the washing fluid to be drawn into the space between the cup casing and the inflation element close to the retaining ring 7.

In Figure 4, an alternative form of the invention is shown, and in this case a hole 11 in the cup casing near the top thereof has a nipple 12 leading from it and depending downwardly and has a rubber tube 13 thereon. A solid nipple 14 near the bottom of the cup receives the other end of the tube 13 for the purpose of preventing air being drawn into the opening 11 during the milking operation. This also serves to hold the rubber piece against the cup when not in use.

In this form of the invention, when it is desired to clean the space between the inflation element 6 and the wall of the cup, the rubber tube 13 is inserted into the washing fluid which is drawn through the hole 11 and along the space between the outer surface of the inflation element and the inner surface of the cup casing and out through the pulsation nipple 10.

What I claim is:—

1. A teat cup comprising a cup casing, an inflation element mounted within said cup casing and spaced at its sides from the sides of the casing, means for the connection of a conduit with said casing for exhausting air from the space between the casing and the inflation element, said casing having an opening therein through which a cleaning fluid is adapted to be drawn into said space by exhausting air from said space, and means normally closing said opening and adapted to be manipulated to uncover the same when it is desired to clean the device.

2. A teat cup as set forth in claim 1 in which the means for normally closing the opening in the cup casing comprises a ring encircling the casing.

3. A teat cup as set forth in claim 1 in which the means for normally closing the opening in the cup casing comprises an elastic ring encircling the casing.

4. A teat cup as set forth in claim 1 in which the cup casing is provided with an exterior annular groove and the opening in the casing opens into said groove and the means for normally closing the opening comprises an elastic ring seated in said groove.

5. A teat cup as set forth in claim 1 in which the cup casing is provided with an annular exterior groove, an annular interior rib, a ring cooperating with the inflation element and the rib to retain the inflation element operatively connected with the casing, and in which the opening in the casing opens through said groove and the means for normally closing said opening comprises an elastic ring seated in the groove.

6. A teat cup comprising a cup casing, an inflation element disposed within said cup casing and spaced at its sides from the sides of the casing, the casing having an annular exterior groove and an alined annular interior rib, a ring within the inflation element cooperating with said rib to retain the inflation element in assembly with the casing, said rib having openings formed therethrough opening into said groove and into the casing at points spaced longitudinally of the casing and with certain of said openings disposed adjacent to said ring, an elastic ring disposed normally within said groove and normally closing said openings and adapted to be manipulated to uncover said openings to permit a cleaning fluid to be admitted to the space between the casing and the inflation element by exhaust of air from said space, and means for the connection of air exhausting means with said space.

7. A teat cup comprising a cup casing, an inflation element mounted within said cup casing and spaced at its sides from the sides of the casing, means for the connection of air exhausting means with said space, said casing having an opening therein through which a cleaning fluid is adapted to be drawn into the space between the casing and the inflation element by exhausting air from said space, a flexible tube connected at one end with the casing in communication with said opening, and a closure element carried by the casing over which the other end of the tube is adapted to be normally engaged to prevent air from entering said space through said opening and said tube during normal operation of the cup, the latter end of said tube being adapted to be removed from said closure element and immersed in a cleaning liquid when it is desired to clean the device.

In testimony whereof, I have signed my name to this specification.

JOSEPH TAYLOR.